US007000299B2

(12) United States Patent
Samchisen

(10) Patent No.: US 7,000,299 B2
(45) Date of Patent: Feb. 21, 2006

(54) SHAFT EXTRACTOR

(76) Inventor: Edward J. Samchisen, 959 Lattabrook Rd., Lowman, NY (US) 14861

( * ) Notice: Subject to any disclaimer, the term of this patent is extended or adjusted under 35 U.S.C. 154(b) by 399 days.

(21) Appl. No.: 10/339,422

(22) Filed: Jan. 9, 2003

(65) Prior Publication Data

US 2004/0134057 A1 Jul. 15, 2004

(51) Int. Cl.
*B23P 19/04* (2006.01)

(52) U.S. Cl. .......................................... 29/239; 29/263

(58) Field of Classification Search .................. 29/263, 29/234, 235, 237, 238, 239, 950, 923, 280, 29/256, 257, 258, 259, 265, 266; 81/119, 81/13

See application file for complete search history.

(56) References Cited

U.S. PATENT DOCUMENTS

| | | | | |
|---|---|---|---|---|
| 2,160,395 A | | 5/1939 | Wettlaufer | |
| D137,909 S | * | 5/1944 | Blanchard | D8/23 |
| 2,403,718 A | * | 7/1946 | Hauck | 81/13 |
| 3,858,300 A | * | 1/1975 | Borel | 29/256 |
| 4,783,893 A | | 11/1988 | Farino | |
| 4,901,418 A | | 2/1990 | Machado et al. | |
| 4,910,849 A | | 3/1990 | Marshall | |
| 5,687,464 A | | 11/1997 | Marshall | |
| 6,336,263 B1 | | 1/2002 | Weiss et al. | |

OTHER PUBLICATIONS

GolfSmith Catalog, 2002, p. 113, Giant Pry Bar *Graphite Shaft Remover*, Stock No. 8230.

GolfSmith Catalog, 2002, p. 111, Golfsmith Professional Shaft Extractor, Stock No. 8324.

GolfSmith Catalog, 2002, p. 111, Weiss-Gibson Ultimate Shaft Extractor, Stock No. 8311.

GolfSmith Catalog, 2002, p. 110, Shaft Keeper, Stock No. 4695.

True Temper, "Reshafting a Club", Dec. 19, 2002, http://www.truetemper.com/Technical/reshafting.htm, pp. 1-4.

* cited by examiner

*Primary Examiner*—Robert C. Watson
(74) *Attorney, Agent, or Firm*—Brown & Michaels, PC

(57) ABSTRACT

A shaft extractor for removing a golf club head from a golf club shaft without causing side-loading to occur comprising: a central body piece having two split screw portions threaded in opposite directions, at opposite sides of a split central hex nut section. The threaded screw portions receive a pair of end split hex nuts, each threaded to fit on one of the oppositely-threaded screw sections of the central body, such that when the central nut is rotated with the end nuts held against rotation, the end nuts move outward or inward together. The split in the central body piece of the shaft extractor forms a central cavity for receiving the golf club shaft. An extractor wrench is used to hold the end nuts against rotation.

6 Claims, 2 Drawing Sheets

SHAFT EXTRACTOR

BACKGROUND OF THE INVENTION

1. Field of the Invention

The invention pertains to an assembly and method for removing a head from a shaft of a golf club. More particularly, the invention relates to using tools for removing the head of a golf club mechanically from the shaft.

2. Description of Related Art

With golf being such a popular sport, fans of the game are constantly looking for ways to improve their shot. One way of making improvements to their game is altering or personalizing the clubs in which the player is using. As shown in FIGS. 7*a* and 7*b*, golf clubs are made up of a handle (not shown), a shaft 26, a ferrule 28, a hosel 34, and a head 32. Both the head and shaft are the most often varied parts of the golf club. The shafts are available in various strengths, diameters, and materials. The heads are available in various sizes and materials. In order to personalize the head of a club, the current head must be removed without damaging the rest of the club, especially the shaft. A common problem with most head removers is that they cause side loading to occur and damage the shaft significantly.

There are various devices used in the prior art for removing the head of the club. One example is Wettlaufers's U.S. Pat. No. 2,160,395. Wettlaufer uses a device having a partial hex nut with a handle and a partially threaded sleeve-like body, where the hex nut sits up against a washer which is placed on the shaft adjacent to the terminal portion of the shank of the club head. The nut is then turned using the handle and the nut pushes on the washer, which in turn pushes against the terminal portion of the club head. The device eventually pushes the head off of the golf club. The problem with this device is that the turning of the nut is limited in travel to the partial threading on the sleeve-like body.

Other devices used to remove golf club heads from their shafts are described in Marshall's U.S. Pat. Nos. 5,687,464 and 4,910,849. Marshall's apparatus disclosed in U.S. Pat. No. 5,687,464, consists of an externally threaded sleeve slipped over the handle of the club from which the head needs to be removed, and placed near the hosel of the club. On top of the threaded portion of the threaded sleeve is a drive member in the form of a coil spring or a rigid tube. A turnstile connected to the drive member is used to advance the drive member, increasing the pressure placed on the hosel. After the hosel is heated, the pressure from the drive member pushes the club head off of the shaft. Marshall's U.S. Pat. No. 4,910,849 discloses a puller for removing the head of a golf club from the shaft. To remove the head of the golf club, the shaft is inserted into a tube and aligned. Once aligned, pins are inserted to maintain the shaft in a proper position. A nut is then rotated proximal-to-distal to compress a spring, which urges a second washer and shaft engaging member to travel in the distal-to-proximal direction. After the nut has traveled an inch or two the spring applies pressure against the flange, urging the shaft to separate form the hosel. Both of Marshall's patents can cause side-loading to occur in the shaft of the golf club.

Weiss' U.S. Pat. No. 6,336,263 uses hydraulic means to separate the golf club head from the shaft. Machado et al. U.S. Pat. No. 4,901,418 uses removal tool that includes a vise and pins which uses a force plate to push the club head off of the shaft. Farino's U.S. Pat. No. 4,783,893 is a method of removing a head from a golf club using a device that has a L-shaped head grasping mechanism and a securing mechanism. The head grasping mechanism is rotated about the securing mechanism and the axis of the shaft of the club being fixed. As the drive mechanism rotates it applies pressure to the head of the club away from the direction of the shaft. The L-shaped head grasping mechanism does not fit the bigger club heads now on the market and does not provide a way of varying the size of the L-shaped grasping mechanism.

Other solutions sold in popular magazines such as GolfSmith® is a giant pry bar, which can leave marks on the shaft and cause side loading to occur, a shaft keeper using spring action, which is hard to use, and other shaft extractors which are very expensive.

Therefore, there was a need for a shaft extractor tool, which was inexpensive, easy to use, and does not cause side-loading or damage the shaft of the golf club.

SUMMARY OF THE INVENTION

A shaft extractor for removing a golf club head from a golf club shaft without causing side-loading to occur comprising: a central body piece having two split screw portions threaded in opposite directions, at opposite sides of a split central hex nut section. The threaded screw portions receive a pair of end split hex nuts, each threaded to fit on one of the oppositely-threaded screw sections of the central body, such that when the central nut is rotated with the end nuts held against rotation, the end nuts move outward or inward together. The split in the central body piece of the shaft extractor forms a central cavity for receiving the golf club shaft. An extractor wrench is used to hold the end nuts against rotation.

The method of using the shaft extractor to remove a golf club head from a golf club shaft comprises the steps of: removing a ferrule from the golf club shaft if one is present, placing the golf club shaft in the central cavity of the shaft extractor such that one end nut of the tool is adjacent to the hosel of the club, securing the shaft extractor and the golf club shaft using a vice, with the opposite end nut adjacent to the vice jaws, placing the extractor wrench on the end nuts of the shaft extractor and using a separate wrench to rotate the central hex nut to apply a pre-load force on the shaft extractor, removing the extractor wrench, heating the hosel, placing the extractor wrench back on the shaft extractor, and using the separate wrench to rotate the partial central hex nut until the golf club head is pressed off, or nearly off of the golf club shaft.

The present invention exerts an axial force along the shaft centerline, and uses a minimal amount of torque to remove the club head. The present invention eliminates any side loading, which is prevalent in prior art club head removers.

DETAILED DESCRIPTION OF THE INVENTION

Figure 1:
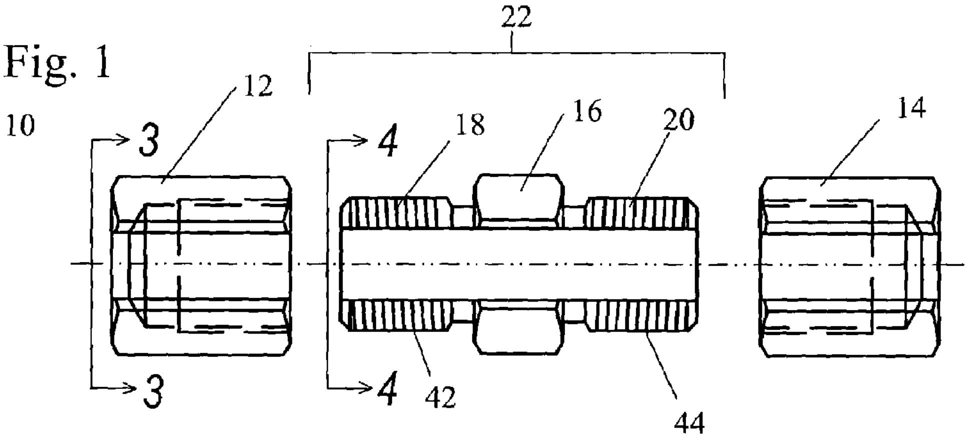
FIG. 1 shows an exploded view of the extractor tool.

FIG. 1 shows the shaft extractor 10 is comprised of a central body piece 22 made up of two threaded screw sections 42, 44 having threads in opposite directions 18, 20 respectively, formed on opposite sides of a split central hex nut 16. Two end hex nuts 12, 14 are threaded to engage the threaded screw sections 42,44. As shown in the example FIG. 1, the threads 18 on threaded screw 42 are to the left and the threads 20 on threaded screw 44 are to the right, although it will be recognized that the threading could be reversed, as long as the threads on screw 44 are in the opposite direction of the threads on screw 42. It will also be recognized that while the term “hex nut” is used in this description, that other nut configurations could be used, for example a square nut or a round element with two opposing flats, so long as the conformation of the nut was such as to allow a wrench to grip the nut.

Figure 2:
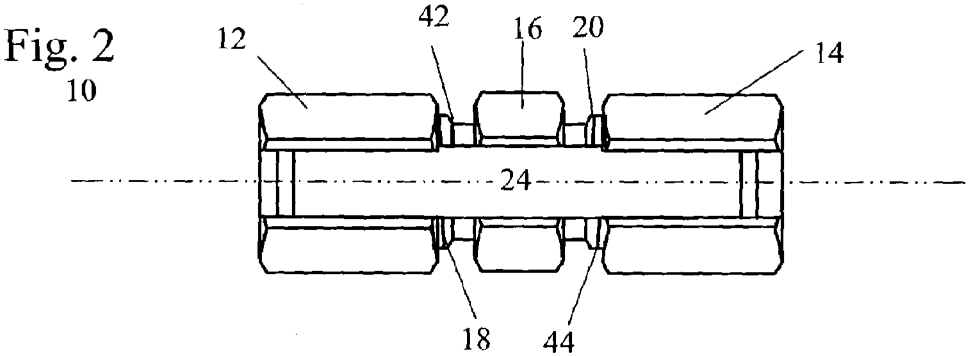
FIG. 2 shows a front view of the extractor tool.
Figure 3:
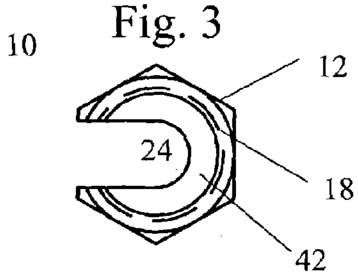
FIG. 3 shows a side view cut along line 3—3 of FIG. 1.
Figure 4:
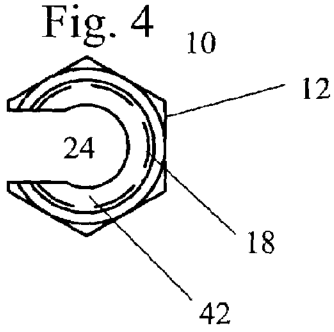
FIG. 4 shows a side view cut along line 4—4 of FIG. 1.

As shown in FIG. 2, a central cavity 24 runs throughout the entire central body piece 22 of the shaft extractor 10. The central cavity 24 in the shaft extractor 10, receives the shaft 26 of the golf club in which the head is to be removed. The central hex nut 16 and threaded sections 42, 44 of the central body 22, and the end nuts 12, 14 are split on one face to allow access to the central cavity 24. FIGS. 3 and 4 show side views cut along lines 3—3 and 4—4 of FIG. 1.

Figure 5:
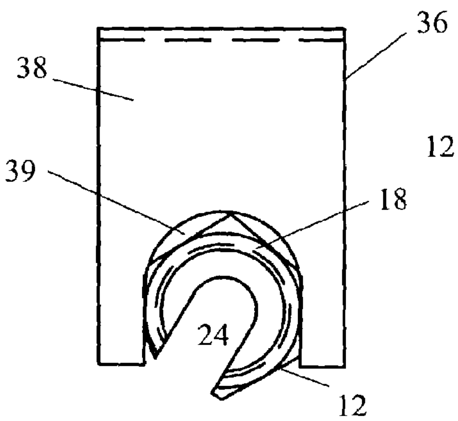
FIG. 5 shows a side view of the extractor tool and wrench.
Figure 6:
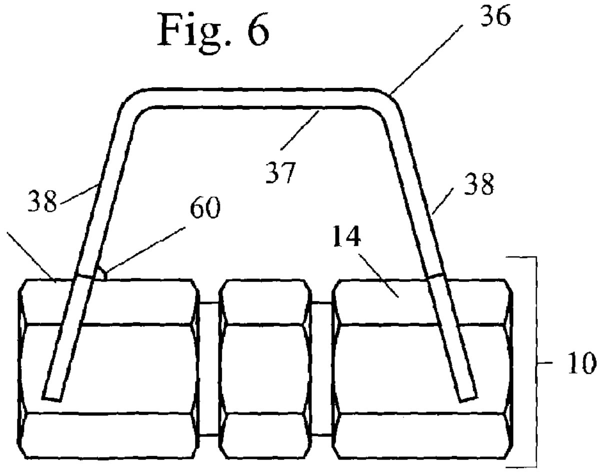
FIG. 6 shows a front view of the extractor tool and wrench.

FIGS. 5 and 6 show one embodiment of the extractor wrench 36 which is used in conjunction with the shaft extractor 10. The extractor wrench 36 is basically “U” shaped, with a center 37 and two end sections 38 having notches 39 which fit over and engage the end nuts 12, 14, holding them against rotation, but allowing them to move inwardly and outwardly. As shown in FIG. 6, the end sections 38 can be inclined to the center section 37, preferably at an angle of about 15°, which maximizes the travel of the two end nuts. Alternatively, as shown in FIGS. 7*a* and 7*b*, the wrench could be made with the end sections at right angles to the center section.

Figure 7A:
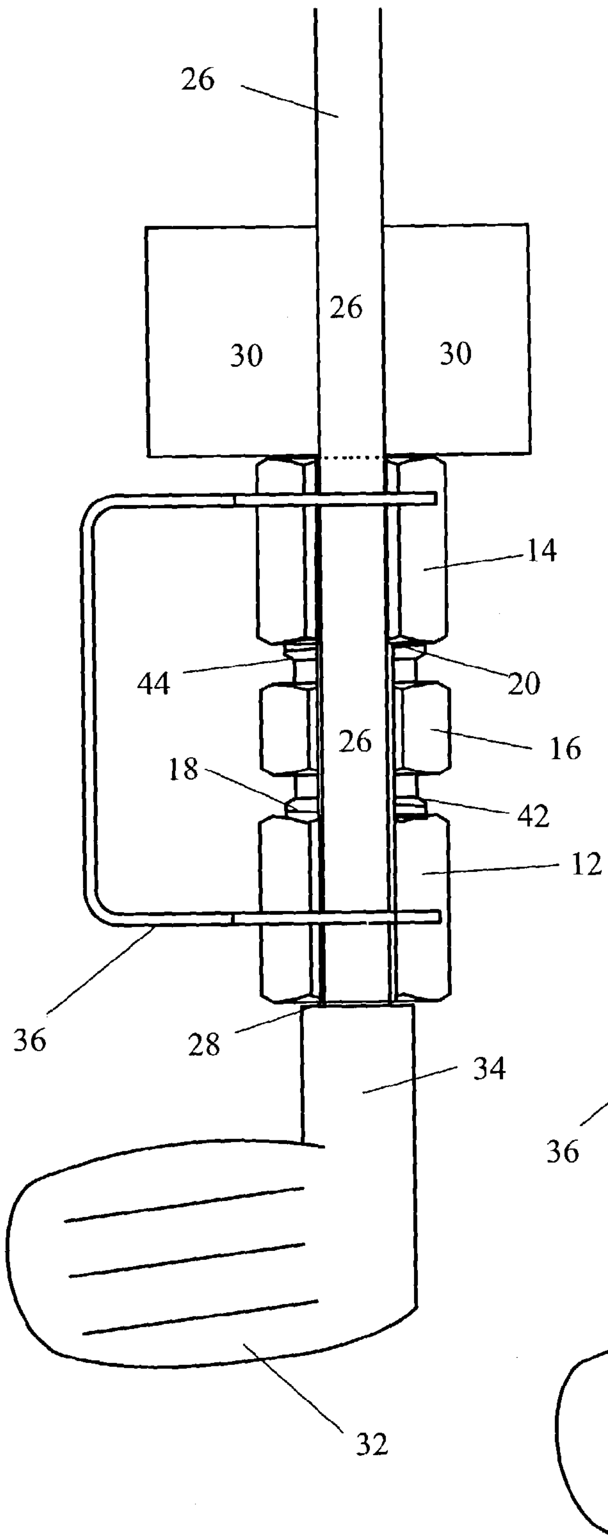
FIGS. 7*a* and 7*b* show the start and end of the method using the extractor tools to remove the club head from the shaft of the golf club respectively.
Figure 7B:
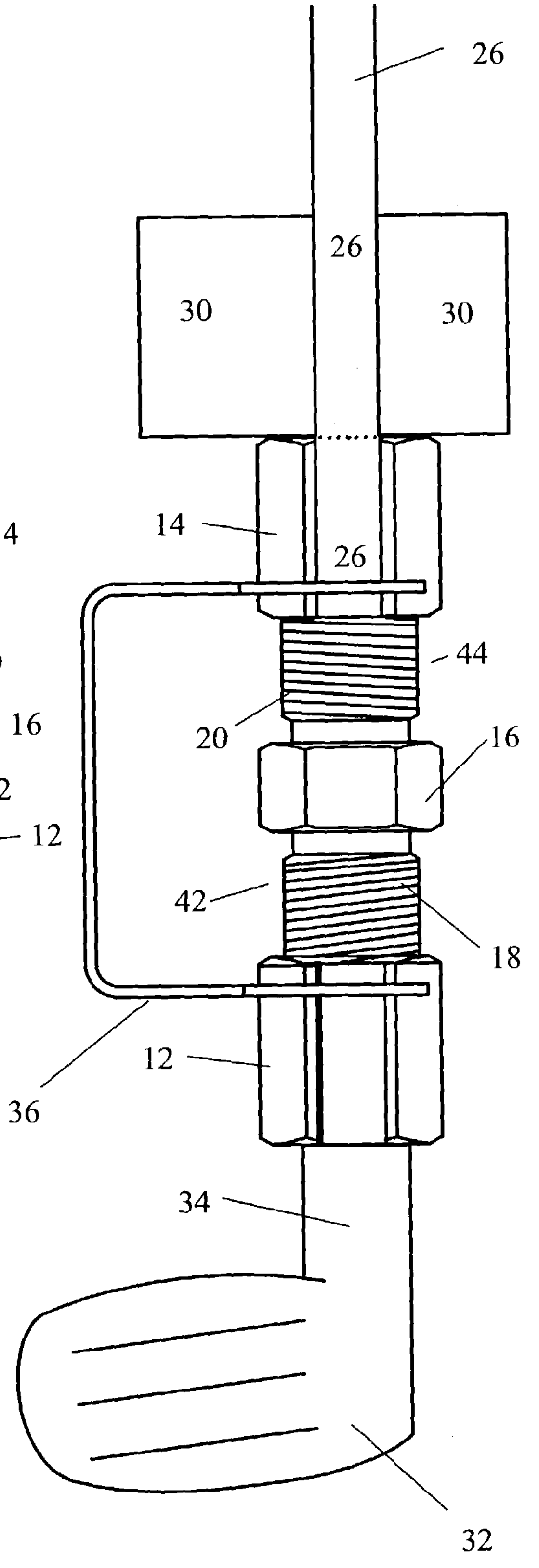

As an alternative to the completely removable wrench shown in FIGS. 7*a* and 7*b*, the extractor wrench 36 can, as shown in FIG. 6, be fastened (preferably by a weld 60) to one of the two end nuts 12. This has the advantage of making it impossible to lose the wrench 36.

By rotating the central hex nut section 16 with the extractor wrench 36 in position, the threaded screws 42, 44 urge the end hex nuts 12, 14 outwards as shown in FIG. 7*b*, exerting a force due to the threads of the screws being in opposing directions. The extractor wrench holds the end nuts from rotating, which prevents the extractor tool from exerting any twisting force on the head or shaft.

FIGS. 7*a* and 7*b* show the start and finish positions of the shaft extractor 10 for removing a golf club head 32 from a golf club shaft 26. Prior to placing the golf club shaft 26 into the shaft extractor 10, the ferrule 28 is removed from the shaft 26 of the golf club, if one were present (reference number 28 in FIGS. 7*a* and 7*b* shows where the ferrule would be present if it were not removed). The ferrule 28 may be removed using any type of utility knife.

Once the ferrule 28 has been removed, with the openings in the end nuts 12, 14 aligned with the central cavity 24 and the end nuts 12, 14 threaded as close to the central nut portion 26 as possible, the shaft extractor 10 is placed onto the shaft 26, with end nut 12 adjacent to the hosel 34 of the golf club. While holding the tool 10 securely to the shaft 26, the golf club is placed in a vise 30, with end nut 14 against the face of the vise 30, as shown in FIG. 7*a*. The vise 30 is tightened to hold the shaft 26 firmly in place. The extractor wrench 36 is then placed onto the shaft extractor 10. While holding the extractor wrench 36, a separate wrench is used to turn the central hex nut 16 two to three flats in order to move the end nuts 12, 14 outward, applying a pre-load force against the hosel 34. The extractor wrench 36 is removed and a heating implement is used to heat the hosel 34 for approximately three minutes to loosen the adhesive holding the club head 32 on the shaft 26 of the golf club.

After heating the hosel 34, the extracting wrench 36 is placed back on the shaft extractor 10. While holding the extractor wrench 36, the central hex nut 16 is turned again, until the club head 32 is off (or nearly off) of the shaft 26. As shown in FIG. 7*b*, the club head 32 has been pushed away from the shaft and may be easily removed.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A shaft extractor for removing a golf club head from a golf club shaft comprising:

a central body piece comprising two threaded screw portions having threads in opposite directions, a central hex nut section between the threaded screw portions, and a central cavity sized to allow the golf club shaft to be placed therein, the screw portions and central hex nut section being split to allow the golf club shaft to pass into the central cavity;

a pair of end hex nuts, threaded to mate with the threaded screw portions of the central body piece, each end hex nut having a split section sized such that when the hex nuts are threaded upon the threaded screw portions of the central body piece, and the split section of the end nut is aligned with the split in the threaded screw portion, the golf club shaft can pass through the split into the central cavity; and an extractor wrench, having a central portion and two end wrench sections for mating with the end hex nuts, such that when the extractor wrench is mated with both end nuts, the end nuts are rotatably fixed to each other, but free to move axially on the threaded screw portions.

2. The shaft extractor of claim 1, wherein the cavity is sized to receive shafts of 0.335 to 0.370 inches in diameter.

3. The shaft extractor of claim 1, in which the end wrench sections of the extractor wrench meet the central portion of the extractor wrench at an acute angle.

4. The shaft extractor of claim 3, in which the angle is approximately 15°.

5. The shaft extractor of claim 1, in which the end wrench sections of the extractor wrench meet the central portion of the extractor wrench at right angles.

6. The shaft extractor of claim 1, in which one of the end wrench sections of the extractor wrench is attached to one of the end hex nuts of the extractor.

* * * * *